(12) United States Patent
Nguyen et al.

(10) Patent No.: US 10,996,723 B1
(45) Date of Patent: May 4, 2021

(54) SYNCHRONIZED RESET FOR A CIRCUIT EMULATOR

(71) Applicant: Cadence Design Systems, Inc., San Jose, CA (US)

(72) Inventors: Quang Nguyen, San Jose, CA (US); Duc Dang, San Jose, CA (US); Raju Joshi, San Jose, CA (US); David Abada, San Jose, CA (US); Akash Sharma, San Jose, CA (US); Zhanhe Shi, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 42 days.

(21) Appl. No.: 16/218,079

(22) Filed: Dec. 12, 2018

(51) Int. Cl.
  *G06F 1/24* (2006.01)
  *G06F 1/10* (2006.01)
(52) U.S. Cl.
  CPC . *G06F 1/24* (2013.01); *G06F 1/10* (2013.01)
(58) Field of Classification Search
  CPC .................................. G06F 1/24; G06F 1/10
  See application file for complete search history.

(56) References Cited

U.S. PATENT DOCUMENTS

| | | | |
|---|---|---|---|
| 5,574,894 A | * | 11/1996 | Iles ..................... G06F 11/3632 713/500 |
| 8,850,381 B1 | | 9/2014 | Ganesan et al. |
| 9,240,997 B1 | * | 1/2016 | Pearson ............. H04L 63/1416 |
| 9,495,492 B1 | | 11/2016 | Ramabadran |
| 10,852,800 B1 | | 12/2020 | Dang et al. |
| 2002/0089361 A1 | * | 7/2002 | Stubbs .................. H03L 7/0814 327/161 |

\* cited by examiner

*Primary Examiner* — Vuthe Siek
(74) *Attorney, Agent, or Firm* — Vista IP Law Group, LLP

(57) ABSTRACT

A method for providing, based on an emulation schedule, a reset message to multiple circuits is provided. The reset message associates a reset signal with a selected clock cycle for each circuit, in the emulation schedule. The method includes determining a mask for each of the circuits based on the emulation schedule, providing a clock signal to the circuits, the clock signal comprising the selected clock cycle for each circuit, and tuning the reset signal relative to the clock signal based on a center of the selected clock cycle for each circuit. The method also includes providing the reset signal to the circuits and asserting the reset signal in the circuits based on the mask. A system and a non-transitory, machine-readable medium storing instructions to perform the above method are also provided.

20 Claims, 6 Drawing Sheets

SYNCHRONIZED RESET FOR A CIRCUIT EMULATOR

TECHNICAL FIELD

Embodiments described herein are generally related to the field of circuit emulation in circuit modeling and fabrication. More specifically, embodiments described herein are related to systems and methods to provide a synchronized reset signal in a circuit emulator including a large number of field-programmable gate arrays (FPGAs) configured to emulate multiple netlists in one or more integrated circuit designs.

BACKGROUND

Emulating current integrated circuit devices is a critical step during device design prior to fabrication. With the evolution of highly sophisticated circuitry, the need for a higher number of gate counts in circuit emulators becomes more pressing. Accordingly, multiple commercially available systems attempt to address this problem with varied degrees of success. One of the challenges in multi-circuit emulation is to keep signals synchronized for the multiple FPGAs intervening in the emulation of each netlist. Moreover, systems working on multiple clients (e.g., different integrated circuits) and on netlists that are independent from one another (even within the same circuit design), lack the ability to perform massively parallel, and securely separated, emulation tests.

The description provided in the background section should not be assumed to be prior art merely because it is mentioned in or associated with the background section. The background section may include information that describes one or more aspects of the subject technology.

SUMMARY

In a first embodiment, a computer-implemented method is described that includes providing, based on an emulation schedule, a reset message to multiple circuits. The reset message associated a reset signal with a selected clock cycle for each circuit, in an emulation schedule. The computer-implemented method includes determining a mask for each of the circuits based on the emulation schedule, providing a clock signal to the circuits, the clock signal including the selected clock cycle for each circuit, and tuning the reset signal relative to the clock signal based on a center of the selected clock cycle for each circuit. The computer-implemented method also includes providing the reset signal to the circuits, and asserting the reset signal in the circuits based on the mask.

In a second embodiment, a system is described, the system including multiple circuits configured to perform an emulation of multiple netlists in an integrated circuit design according to an emulation schedule, and multiple connectors having a selected length coupling a first circuit to other circuits from the multiple circuits. Each of the circuits includes a memory storing instructions, and a processor configured to execute the instructions to cause the system to provide, based on the emulation schedule, a reset message from the first circuit to the other circuits. The reset message including a reset signal at a selected clock cycle for each circuit, in the emulation schedule. The processor also executes instructions to determine a mask for each of the circuits based on the emulation schedule, to provide a clock signal to the circuits, the clock signal including the selected clock cycle for each circuit, and to tune the reset signal relative to the clock signal based on a center of the selected clock cycle for each circuit. The processor also executes instructions to provide the reset signal to the other circuits, and to assert the reset signal in the other circuits based on the mask.

In yet another embodiment, a non-transitory, machine-readable storage medium is described that includes machine-readable instructions for causing a processor to execute a method for providing, based on an emulation schedule, a reset message to multiple circuits, the reset message including a reset signal at a selected clock cycle for each circuit, and determining a mask for each of the circuits based on the emulation schedule. The method includes providing a clock signal to the circuits, the clock signal including the selected clock cycle for each circuit, tuning the reset signal relative to the clock signal based on a center of the selected clock cycle for each circuit, providing the reset signal to the circuits, and asserting the reset signal in the circuits based on the mask.

In a further embodiment, a system is described that includes a means for storing computer code and a means to execute the computer code to perform steps to provide, based on an emulation schedule, a reset message from the first circuit to the other circuits. The reset message including a reset signal at a selected clock cycle for each circuit, in the emulation schedule. The means to execute the computer code also executes computer code to determine a mask for each of the circuits based on the emulation schedule, to provide a clock signal to the circuits, the clock signal including the selected clock cycle for each circuit, and to tune the reset signal relative to the clock signal based on a center of the selected clock cycle for each circuit. The means to execute the computer code also executes computer code to provide the reset signal to the other circuits, and to assert the reset signal in the other circuits based on the mask.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
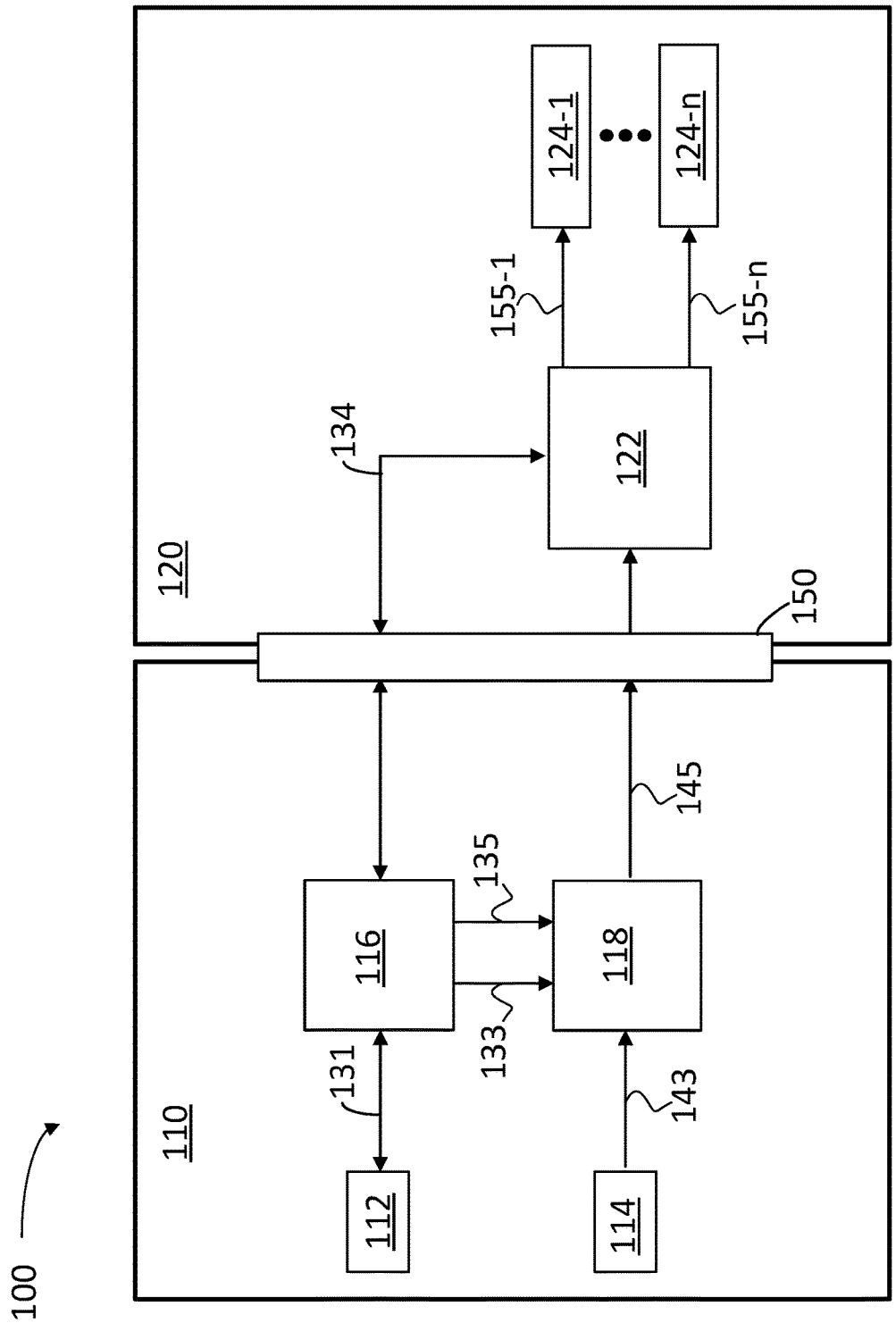
FIG. 1 illustrates a circuit configured to receive a reset signal to perform an emulation schedule, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Embodiments as disclosed herein address the problem of providing synchronized reset signals to a massively parallelized circuit emulation frame emulating multiple instances of multiple netlists for multiple clients, and a cross a hierarchy of emulation devices.

Embodiments as disclosed herein include precisely measured cables and connectors coupling different FPGAs in a circuit emulator, in addition to handle signaling to each of the multiple FPGAs across the system hierarchy at two levels. In an asynchronous level, where timing is not crucial, specific information as to emulation masks and schedules is provided to a central processing unit (CPU). In a synchronous level, a precise cabling provides the reset signal, which is tuned relative to a local clock, and then provided to each of the individual FPGAs according to the mask.

The disclosed system addresses a technical problem tied to computer technology and arising in the realm of integrated circuit emulation, namely the problem of providing synchronized reset signals to multiple FPGAs for circuit emulation in massively parallel computation environments.

FIG. 1 illustrates a circuit 100 configured to receive a reset message 131 in a processor 116 and a reset signal 143 in a gateway controller (GCF) 118, to perform an emulation schedule, according to some embodiments. In embodiments consistent with the present disclosure, reset message 131 may be provided out-of-band, or asynchronously, to processor 116, while reset signal 143 is desirably provided synchronously with a clock signal, or is susceptible of being synchronized with a clock signal, throughout the components in circuit 100. Circuit 100 includes a gateway interface board (GIB) 110 and a prototype processing board (PPB) 120 separated by a mid-plane board 150. Reset message 131 includes a pointer or indicator for reset signal 143 and a selected clock cycle for each circuit 100 wherein the reset signal 143 is to be asserted, according to the emulation schedule.

Processor 116, e.g., a central processing unit (CPU), receives reset message 131 from a communications port 112 (e.g., an Ethernet port). Reset signal 143 is provided remotely from a reset port 114 to GCF 118. GCF 118 synchronizes reset signal 143 using a control signal 133 and a clock signal 135 provided by processor 116. Clock signal 135 includes the selected clock cycle for asserting the reset signal, according to the emulation schedule. In some embodiments, GCF 118 is configured to tune reset signal 143 relative to clock signal 135 based on a center of the selected clock cycle for each circuit.

A synchronized reset signal 145 is transferred to PPB 120 through mid-plane board 150. A control signal 134 is also transferred to PPB 120 through mid-plane board 150. A bit stream director (BSD) 122 in PPB 120 receives control signal 133 and synchronized reset signal 145. BSD 122 provides masked reset signals 155-1 through 155-n (hereinafter, collectively referred to as "masked reset signals 155") to any combination of, or all, FPGAs 124-1 through 124-n (hereinafter, collectively referred to as "FPGAs 124"). Accordingly, BSD 122 applies a mask to synchronized reset signal 145, wherein one or more of FPGAs 124 is selected to receive and assert synchronized reset signal 145 according to an emulation schedule. For example, in some embodiments, synchronized reset signal 145 is applied only to FPGAs 124 associated with a specific netlist in a circuit emulation instance. Accordingly, all FPGAs 124 not involved in the specific circuit emulation instance are masked out of synchronized reset signal 145 by BSD 122. In some embodiments, BSD 122 is configured to determine the mask for each of FPGAs 124, based on the emulation schedule, and to assert the reset signal in the other circuits based on the mask.

Figure 2:
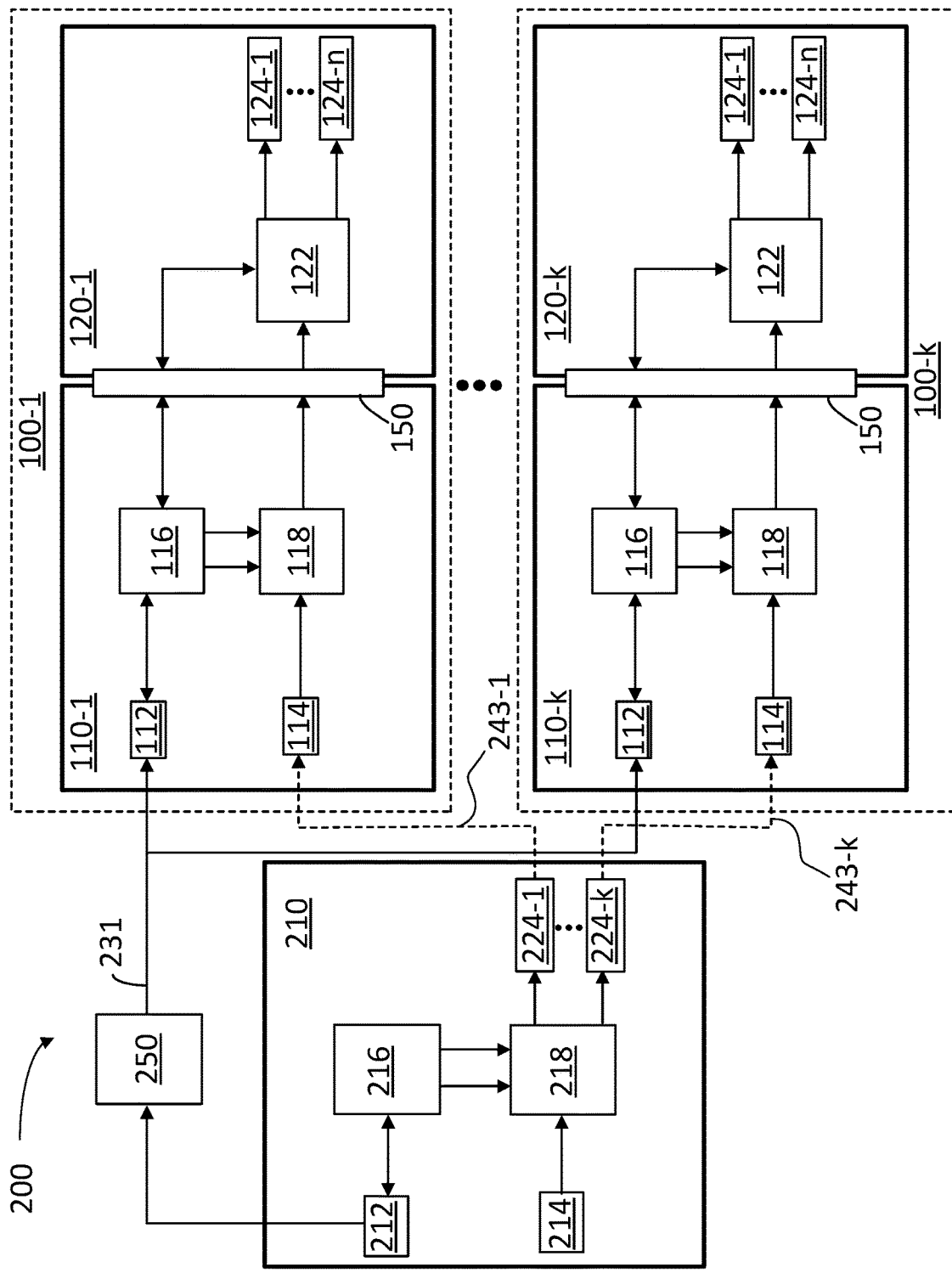
FIG. 2 illustrates a system including multiple circuits to perform an emulation of multiple netlists in an integrated circuit design, or a single design partitioned into multiple netlists, or both, according to some embodiments.

FIG. 2 illustrates a system 200 including multiple circuits 100-1 to 100-k (hereinafter, collectively referred to as "circuits 100") to perform an emulation of multiple netlists in an integrated circuit design, according to some embodiments. In some embodiments, e.g., a large design, a single netlist may be spread (or partitioned) across multiple FPGAs for emulation, thus resulting in multiple circuits 100 associated with the same netlist. Each of circuits 100 may be as described above. Accordingly, each of circuits 100 includes a GIB 110 (e.g., GIB 110-1 through GIB 110-k), and a PPB 120 (e.g., PPB 120-1 through 120-k). In each GIB 110, a communications port 112 provides a reset message to CPU 116 and reset port 114 provides a reset signal to GCF 118. GIB 110 provides the control signal and a synchronized reset signal to PPB 120 through mid-plane board 150. BSD 122 in PPB 120 applies a mask to the synchronized reset signal before providing the individual reset signals to FPGAs 124.

System 200 includes a master GIB 210 to provide reset message 231 to an Ethernet switch 250 via a communications port 212. Ethernet switch 250 distributes the reset message to the rest of circuits 200, which distributes reset message 231 to each of the communication ports 112 in circuits 100. Master GIB 210 also provides reset signals 243-1 through 243-k (hereinafter, collectively referred to as "reset signals 243") to each of circuits 100, through reset ports 114. Master GIB 210 includes a CPU 216 and a GCF 218. CPU 216 provides a clock signal and a control signal to GCF 218. In addition to a reset signal provided by port 214, the clock and control signal are used by GCF 218 to provide synchronized reset signals to remote outputs 224-1 through 224-k (hereinafter, collectively referred to as "remote outputs 224"). Remote outputs provide reset signals 243 to reset ports 114 in circuits 100. In some embodiments, it is desirable that the connectors and cables communication remote outputs 224 to reset ports 114 have a similar length, at least within a few nanoseconds, or less. Accordingly, any skew or delay in the data is desirably less than the duty cycle of a clock pulse, which is in the order of a few nanoseconds (e.g., 5 ns or less) for a clock rate of about 200 MHz.

Accordingly, system 200 may include multiple connectors or cables having a selected length coupling master GIB 210 to circuits 100 to provide reset signals 243.

In some embodiments, CPU 216 may also determine a mask for FPGAs 124 in each of circuits 100, based on the emulation schedule. Further, in some embodiments, master GIB 210 may provide the mask to circuits 100 through Ethernet switch 250. Further, in some embodiments, GCF 218 provides a clock signal to circuits 100, simultaneously with reset signals 243. The clock signal includes a selected clock cycle for the reset of each FPGA 124.

Figure 3:
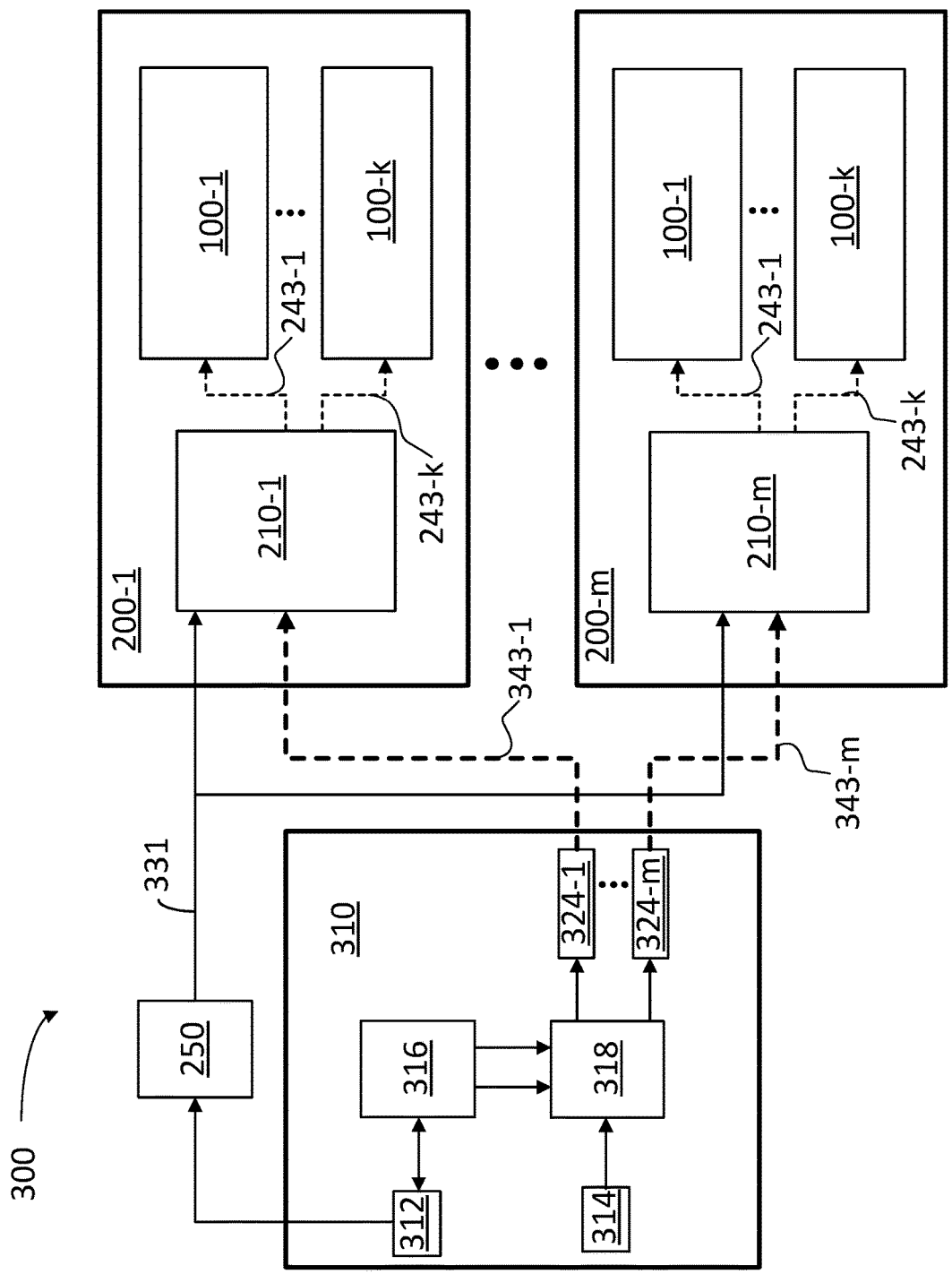
FIG. 3 illustrates a system including multiple circuits to perform multiple emulations of multiple netlists in multiple integrated circuit designs, or a single large design partitioned into multiple netlist, or both, according to some embodiments.

FIG. 3 illustrates a system 300 including multiple circuits 200-1 through 200-m (hereinafter, collectively referred to as "circuits 200") to perform multiple emulations of multiple netlists in multiple integrated circuit designs, according to some embodiments. Circuits 200 are as described in detail above. Accordingly, each of circuits 200 includes a master GIB 210-1 through 210-m (hereinafter, collectively referred to as "master GIBs 210"). Master GIBs 210 provide reset signals 243 to each of circuits 100-1 through 100-k (collectively referred, hereinafter, as "circuits 100," see above). Circuits 100 are as described in detail above, in reference to FIGS. 1 and 2.

A supra-master GIB 310 provides the highest hierarchy of reset signals 343-1 through 343-m (hereinafter, collectively referred to "reset signals 343") in system 300. Signals 343 are provided from remote outputs 324-1 through 324-m (hereinafter, collectively referred to as "remote outputs 324") to the remote ports in each of master GIBs 210. Accordingly, connectors and cables coupling remote outputs 324 with master GIBs 210 desirably have similar length, at least to within a few nanoseconds from each other, so that limited or no skew is added to the clock synchronization signal and the reset signals in system 300. A processor 316 in GIB 310 provides a clock signal and a control signal to a GCF 318, which prepares a synchronized reset signal to each of remote outputs 324 based on an input reset signal provided by remote port 314. A communications port 312 provides a reset message 331, to Ethernet switch 250. Switch 250 then distributes reset message 331 to the rest of circuits 200.

Figure 4:
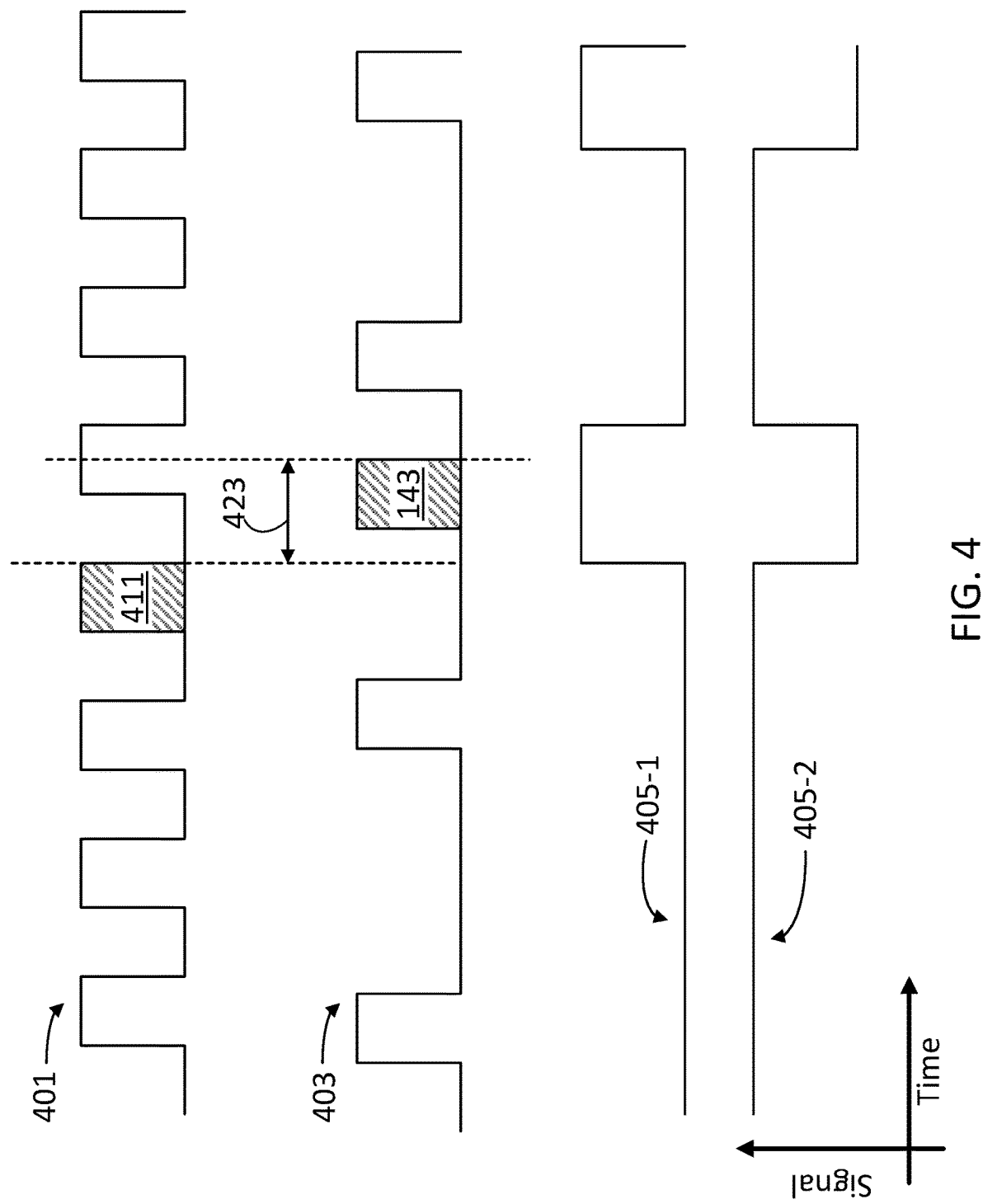
FIG. 4 illustrates a clock sequence, a reset signal sequence, and masks signals in a synchronized reset for a circuit emulator, according to some embodiments.

FIG. 4 illustrates a clock sequence 401, a reset signal sequence 403, and masks signals 405-1 and 405-2 (hereinafter, collectively referred to as "mask signals 405") in a synchronized reset for a circuit emulator, according to some embodiments.

A selected clock cycle 411 may indicate a desired timing for a reset event in a circuit emulation frame. For example, a reset message may indicate to a given GIB (e.g., reset message 131 to GIB 110) that a specific FPGA (e.g., FPGA 124-1) is selected to be reset upon clock pulse 411. GIB 110 may then instruct a GCF (e.g., GCF 418) to synchronize reset signal sequence 403 so that a reset signal 143 is aligned with clock pulse 411. To do this, the GCF circuit may add a time delay 423 to reset signal sequence 403.

A BSD circuit (e.g., BSD 122) provides mask signal 405-1 so that FPGA 124-1 sees and asserts reset signal 143. In some embodiments, the BSD circuit may provide mask signal 405-1 to more than one FPGA circuit, when reset signal 143 is associated with a netlist being emulated by more than one FPGA circuit. Further, the BSD circuit may also provide mask signal 405-2 to a different FPGA circuit in a battery of FPGA circuits, wherein reset signal 143 is blocked.

Figure 5:
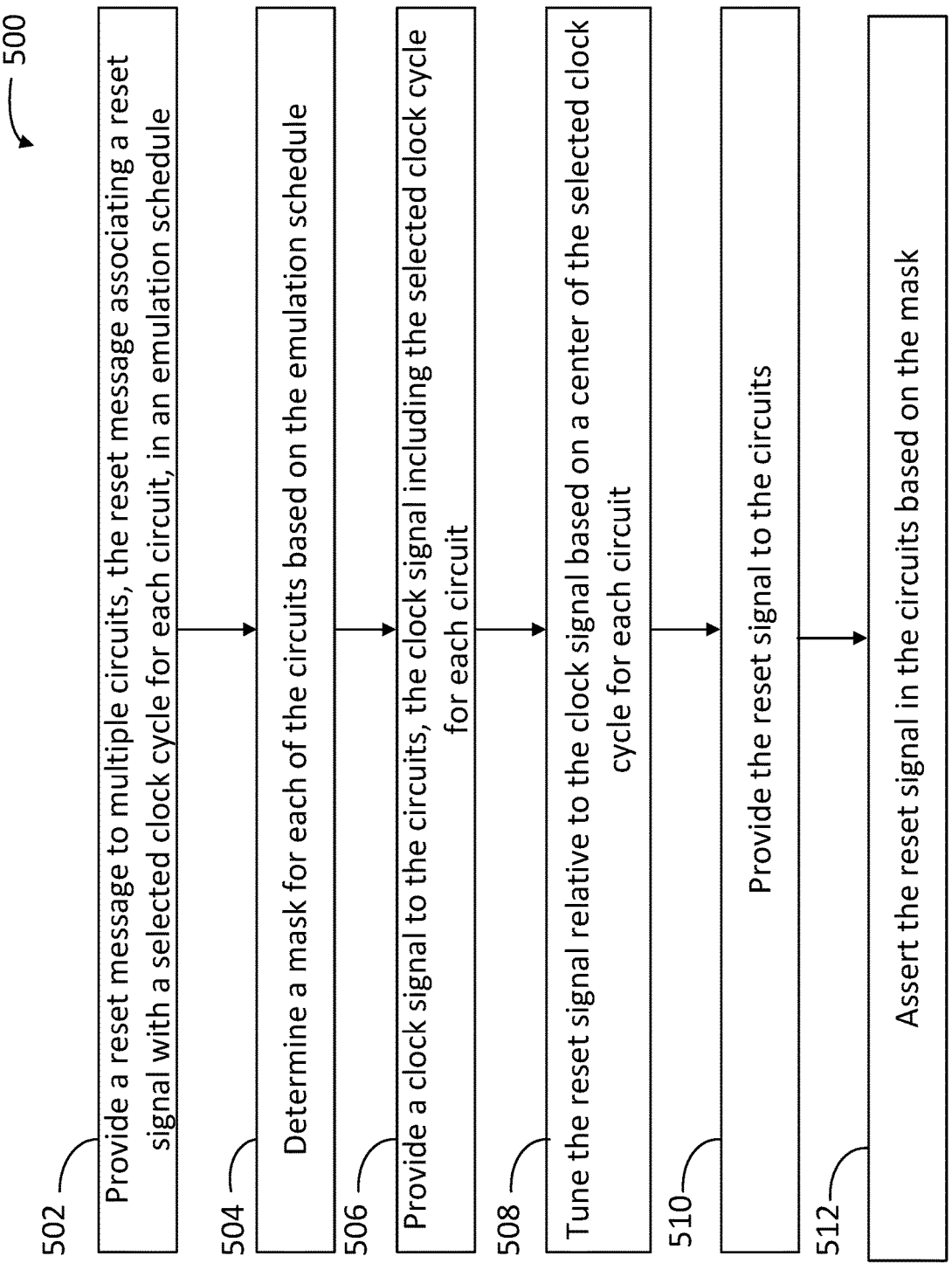
FIG. 5 is a flowchart including steps in a method for providing a reset signal for multiple circuits in an emulation of an integrated circuit design, according to some embodiments.

FIG. 5 is a flowchart including steps in a method 500 for providing a reset signal for multiple circuits in an emulation of an integrated circuit design, according to some embodiments. Method 500 may be performed at least partially by a central processing unit or a gateway control in a gateway interface board, or a bit stream director in a prototype processing board in a circuit emulator system, (e.g., GIBs 110, 210, and 310, CPUs 116, 216, and 316, GCFs 118, 218, and 318, PPBs 120, and BSD 122 in systems 100, 200, and 300). In some embodiments, the emulator tool may include one or more FPGAs configured to execute a register transfer level (RTL) code provided by a compiler tool (e.g., FPGAs 124). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes providing a reset message to multiple circuits, the reset message associating a reset signal with a selected clock cycle for each circuit, in an emulation schedule. In some embodiments, step 502 includes providing the reset message to each circuit via an Ethernet connection. In some embodiments, step 502 includes characterizing a signal path to each of the circuits and selecting the clock signal for each circuit based on the signal path.

Step 504 includes determining a mask for each of the circuits based on the emulation schedule. In some embodiments, step 504 includes selecting a group of circuits in an emulation netlist to be blocked from the reset signal, according to the emulation schedule. In some embodiments, each of the circuits comprises multiple field-programmable gate arrays emulating a netlist according to an emulation schedule. Accordingly, step 504 may include selecting a first field-programmable gate array to receive and assert the reset signal when the emulation schedule includes a netlist corresponding to the first field-programmable gate array.

Step 506 includes providing a clock signal to the circuits, the clock signal including the selected clock cycle for each circuit. In some embodiments, step 506 includes providing the clock signal to the circuits and the reset signal in a same connector.

Step 508 includes tuning the reset signal relative to the clock signal based on a center of the selected clock cycle for each circuit. In some embodiments, step 508 includes adding a delay to the reset signal relative to the clock signal.

Step 510 includes providing the reset signal to the circuits. In some embodiments, step 510 includes allowing a time skew of the reset signal within the selected clock cycle for each circuit. In some embodiments, step 510 includes providing the reset signal via a remote input connector having a selected length.

Step 512 includes asserting the reset signal in the circuits based on the mask. In some embodiments, step 512 includes resetting multiple gates in a field-programmable gate array in one of the circuits and configuring the field-programmable gate array to receive a signal corresponding to a stage in the emulation schedule for a netlist associated with the field-programmable gate array.

Figure 6:
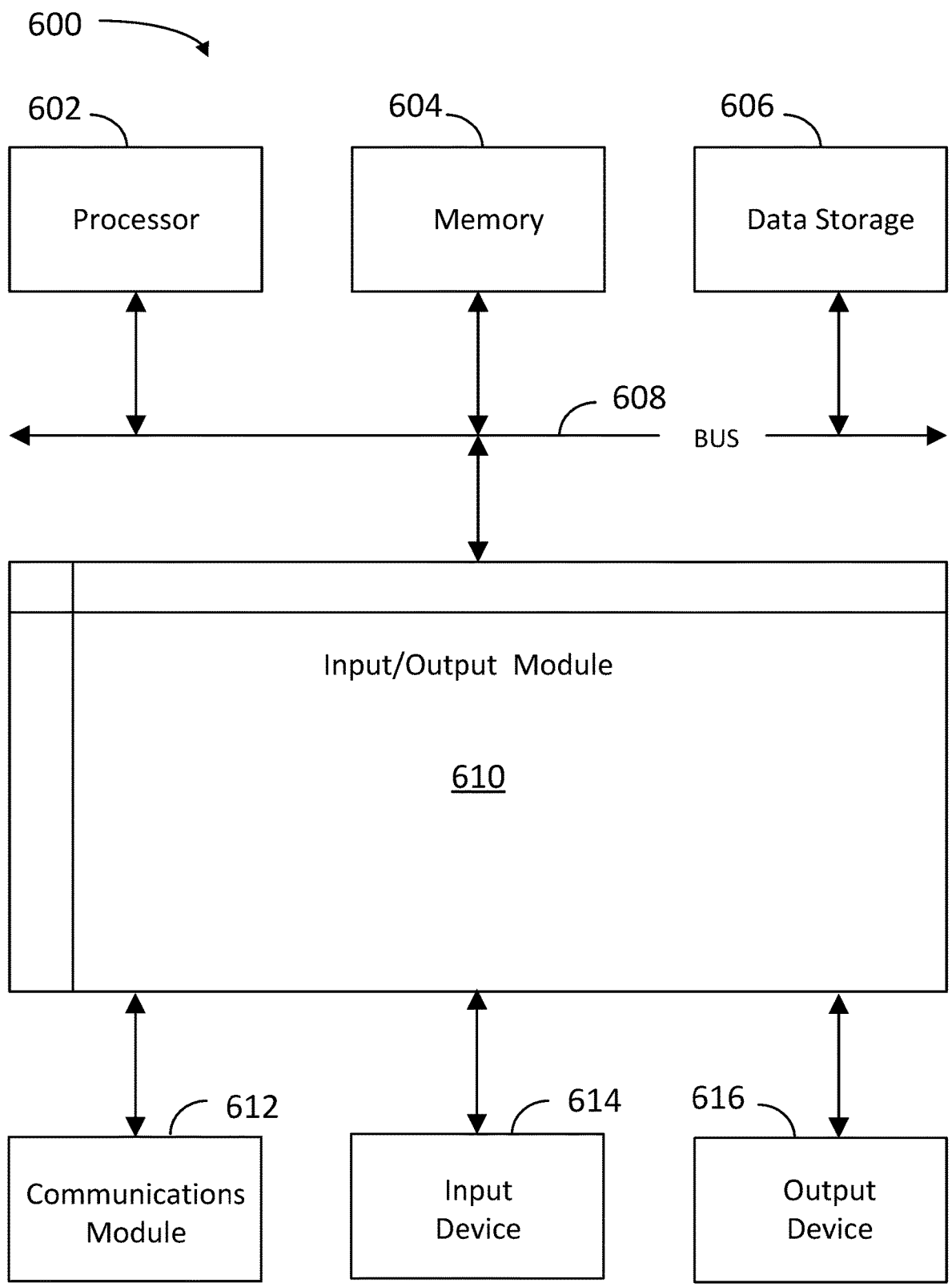
FIG. 6 is a block diagram illustrating an example computer system that includes multiple circuits to perform an emulation of multiple netlists in an integrated circuit design, according to some embodiments.

FIG. 6 is a block diagram illustrating an example computer system 600 with which the methods, steps, and systems illustrated in FIG. 5 can be implemented, according to some embodiments. More specifically, computer system 600 may include multiple circuits to perform an emulation of multiple netlists in an integrated circuit design, as disclosed herein. In certain aspects, computer system 600 can be implemented using hardware or a combination of software and hardware, either in a dedicated server, integrated into another entity, or distributed across multiple entities.

Computer system 600 includes a bus 608 or other communication mechanism for communicating information, and a processor 602 coupled with bus 608 for processing information. By way of example, computer system 600 can be implemented with one or more processors 602. Processor 602 can be a general-purpose microprocessor, a microcontroller, a Digital Signal Processor (DSP), an Application Specific Integrated Circuit (ASIC), a Field-Programmable Gate Array (FPGA), a Programmable Logic Device (PLD), a controller, a state machine, gated logic, discrete hardware components, or any other suitable entity that can perform calculations or other manipulations of information. In some embodiments, processor 602 may include modules and circuits configured as a 'placing' tool or engine, or a 'routing' tool or engine, to place devices and route channels in a circuit layout, respectively and as disclosed herein.

Computer system 600 includes, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. Processor 602 and memory 604 can be supplemented by, or incorporated in, special purpose logic circuitry.

The instructions may be stored in memory 604 and implemented in one or more computer program products, e.g., one or more modules of computer program instructions encoded on a computer-readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NETLIST), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions.

Computer system 600 is coupled via input/output module 610 to various devices. The input/output module 610 is any input/output module. Example input/output modules 610 include data ports such as USB ports. The input/output module 610 is configured to connect to a communications module 612. Example communications modules 612 include networking interface cards, such as Ethernet cards and modems. In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as an LED (light emitting diode), CRT (cathode ray tube), or LCD (liquid crystal display) screen, for displaying information to the user.

Methods as disclosed herein may be performed by computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein (e.g., as in method 500). One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., Ethernet switch 250, and the like. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 600 includes servers and personal computer devices. A personal computing device and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 602 for execution. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   providing, according to an emulation schedule, a reset message to multiple circuits, the reset message associating a reset signal with a selected clock cycle for each circuit;
   providing a clock signal to the circuits, the clock signal comprising the selected clock cycle for each circuit;
   tuning a timing of the reset signal relative to the selected clock cycle for each circuit; and
   providing the reset signal to the multiple circuits.

2. The computer-implemented method of claim 1, wherein the reset signal is provided to each circuit via an Ethernet connection.

3. The computer-implemented method of claim 1, further comprising characterizing a signal path to each of the circuits and selecting the clock signal for each circuit based on the signal path.

4. The computer-implemented method of claim 1, further comprising determining a mask for the circuits based on the emulation schedule, by at least identifying a group of circuits in an emulation netlist that will are not to receive the reset signal.

5. The computer-implemented method of claim 1, wherein each circuit of the multiple circuits comprises multiple field-programmable gate arrays emulating a netlist according to an emulation schedule, and determining a mask for each of the multiple circuits comprises selecting a first field-programmable gate array to receive and assert the reset signal when the emulation schedule includes a netlist corresponding to the first field-programmable gate array.

6. The computer-implemented method of claim 1, further comprising transmitting the clock signal and the reset signal over a single connector.

7. The computer-implemented method of claim 1, wherein the reset signal is tuned relative to a center of the selected clock cycle for each circuit and tuning a timing of the reset signal comprises adding a delay to the reset signal relative to the clock signal.

8. The computer-implemented method of claim 1, wherein providing the reset signal to the multiple circuits comprises providing the reset signal via a connection having a selected length.

9. The computer-implemented method of claim 1, further comprising asserting the reset signal in the multiple circuits based on a mask, wherein asserting the reset signal in the circuits comprises resetting multiple gates in a field-programmable gate array in one of the circuits and configuring the field-programmable gate array to receive a signal corresponding to a stage in the emulation schedule for a netlist associated with the field-programmable gate array.

10. A system, comprising:
    multiple circuits configured to perform an emulation of multiple netlists in an integrated circuit design according to an emulation schedule; and
    multiple connectors having a selected length coupling a first circuit to other circuits from the multiple circuits, wherein
    each of the circuits comprises a memory storing instructions, and a processor configured to execute the instructions to cause the system to:
      provide, based on the emulation schedule, a reset message from the first circuit to the other circuits, the reset message comprising a reset signal at a selected clock cycle for each circuit;
      provide a clock signal to the circuits, the clock signal including the selected clock cycle for each circuit;
      tune a timing of the reset signal relative to the selected clock cycle for each circuit; and
      provide the reset signal to the other circuits.

11. The system of claim 10, wherein the multiple circuits are arranged in a hierarchical configuration forming an extensible design, wherein the system may further include multiple cascading hierarchical levels, and wherein a number of circuits that are reset synchronously increases from one hierarchical level to the next.

12. The system of claim 10, wherein the processor executes instructions to provide the reset message to each circuit via an Ethernet connection.

13. The system of claim 10, wherein the reset signal is tuned relative to a center of the selected clock cycle for each circuit and a delay to the reset signal relative to the clock signal.

14. The system of claim 10, wherein the reset signal is provided via a connection having a selected length.

15. The system of claim 10, wherein each of the connectors is configured to provide the clock signal and the reset signal to the circuits.

16. The system of claim 10, wherein the processor configured to execute the instructions to further cause the system to determine a mask for the circuits based on the emulation schedule, by at least identifying a group of circuits in an emulation netlist that will are not to receive the reset signal.

17. The system of claim 10, wherein the processor configured to execute the instructions to further cause the system to characterize a signal path to each of the circuits and select the clock signal for each circuit based on the signal path.

18. A non-transitory, computer-readable medium storing instructions which, when executed by a processor, cause a computer to perform a set of acts, the set of acts comprising:
    providing, based on an emulation schedule, a reset message to multiple circuits, the reset message including a reset signal at a selected clock cycle for each circuit;
    providing a clock signal to the circuits, the clock signal comprising the selected clock cycle for each circuit;
    tuning a timing of the reset signal relative to the selected clock cycle for each circuit; and
    providing the reset signal to the multiple circuits.

19. The non-transitory, computer-readable medium of claim 18 wherein the reset signal is provided to each circuit via an Ethernet connection.

20. The non-transitory, computer-readable medium of claim 18 wherein the reset signal is tuned relative to a center of the selected clock cycle for each circuit and tuning a timing of the reset signal comprises adding a delay to the reset signal relative to the clock signal.

\* \* \* \* \*